US010767010B2

(12) United States Patent
CS et al.

(10) Patent No.: US 10,767,010 B2
(45) Date of Patent: Sep. 8, 2020

(54) PURIFIED POLY(PHENYLENE ETHER), AND POLY(PHENYLENE ETHER) COMPOSITION AND ARTICLE

(71) Applicant: SABIC Global Technologies B.V., Bergen op Zoom (NL)

(72) Inventors: Gurunath CS, Karnataka (IN); Arun Kumar, Karnataka (IN); Kalsang Tharpa, Karnataka (IN); Jinto Jose, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/355,044

(22) Filed: Mar. 15, 2019

(65) Prior Publication Data

US 2019/0292316 A1    Sep. 26, 2019

(30) Foreign Application Priority Data

Mar. 22, 2018 (EP) .................................. 18163293

(51) Int. Cl.
| | |
|---|---|
| *C08G 65/46* | (2006.01) |
| *B01J 20/12* | (2006.01) |
| *B01J 20/28* | (2006.01) |
| *C08G 65/38* | (2006.01) |
| *C08K 3/34* | (2006.01) |
| *C08K 5/09* | (2006.01) |
| *C08K 5/17* | (2006.01) |
| *C08L 71/12* | (2006.01) |

(52) U.S. Cl.
CPC .............. *C08G 65/46* (2013.01); *B01J 20/12* (2013.01); *B01J 20/28061* (2013.01); *C08G 65/38* (2013.01); *C08K 3/346* (2013.01); *C08K 5/09* (2013.01); *C08K 5/17* (2013.01); *C08L 71/123* (2013.01)

(58) Field of Classification Search
USPC ......................................................... 528/482
See application file for complete search history.

(56) References Cited

U.S. PATENT DOCUMENTS

| | | |
|---|---|---|
| 2,130,948 A | 9/1938 | Carothers |
| 5,057,642 A | 10/1991 | Johnson et al. |
| 6,946,578 B2 | 9/2005 | Nakano et al. |
| 8,017,697 B2 | 9/2011 | Carrillo et al. |
| 2005/0222380 A1 | 10/2005 | Peters et al. |
| 2009/0062478 A1 | 3/2009 | Carrillo et al. |

FOREIGN PATENT DOCUMENTS

| | | |
|---|---|---|
| CN | 102099379 | 12/2013 |
| DE | 3342178 | 5/1985 |
| EP | 0435023 A2 | 7/1991 |
| EP | 0460311 | 12/1991 |
| GB | 1219335 | 6/1968 |
| WO | 201403819 A1 | 1/2014 |

*Primary Examiner* — Terressa Boykin
(74) *Attorney, Agent, or Firm* — Cantor Colburn LLP

(57) ABSTRACT

Purification of a poly(phenylene ether) includes contacting a liquid feed solution with a hydrated acidic clay adsorbent under conditions effective to provide a liquid effluent solution. The liquid feed solution includes a poly(phenylene ether), an organic acid impurity, and an amine impurity. The weight average molecular weight of the poly(phenylene ether) of the liquid effluent solution is within 1 percent of the weight average molecular weight of the poly(phenylene ether) of the feed solution, and the concentration of the amine impurity and the organic acid impurity of the liquid effluent solution is reduced by at least 40 percent relative to the concentration of the each impurity in the feed solution. Compositions and articles comprising a purified poly(phenylene ether) are also described.

18 Claims, No Drawings

PURIFIED POLY(PHENYLENE ETHER), AND POLY(PHENYLENE ETHER) COMPOSITION AND ARTICLE

BACKGROUND

Poly(phenylene ether)s are commercially attractive materials because of their unique combination of physical, chemical, and electrical properties. Furthermore, the combination of poly(phenylene ether)s with other polymers or additives provides blends which result in improved overall properties including chemical resistance, high strength, and high flow. As new commercial applications are explored, higher purity poly(phenylene ether) materials are desired.

The processes most generally used to produce poly(phenylene ether)s involve the self-condensation of at least one monovalent phenol in the presence of an oxygen containing gas and a catalyst comprising a metal amine complex to produce resins typically within the intrinsic viscosity range of 0.35 to 0.65 deciliter per gram as measured in chloroform at 25° C. These processes are typically carried out in the presence of an organic solvent and the reaction is usually terminated by removal of the catalyst from the reaction mixture. The catalyst metal, after being converted into a soluble metal complex with the aid of a chelating agent, is removed from the polymer solution with standard extraction techniques, such as liquid-liquid extraction.

Various techniques of isolating and purifying poly(phenylene ether)s have been described. For example, GB 1219335 relates to a process for the purification and decolorizing of a poly(phenylene ether), where a solution of an aryl substituted poly(phenylene ether) is contacted with an ion exchange resin and an adsorbent which is alumina, charcoal, a metal silicate, or a mixture thereof. EP 0435023 teaches a method for removing volatile substances from poly(phenylene ether) blends by extruding with multiple stages of water injection followed by vacuum venting. US 2009/062478 relates to a method of preparing capped poly (arylene ether)s that includes washing the reaction mixture with a concentrated basic aqueous solution.

There remains a need for an improved method for purifying a poly(phenylene ether) that overcomes limitations associated with known processes. Such a process would desirably provide a poly(phenylene ether) composition that meets various purity specifications, specifically related to residual organic acid and/or amine impurities. Additionally, a preferred process would reduce or eliminate both organic acid and amine impurities using a single technique.

BRIEF DESCRIPTION

A process for purification of a poly(phenylene ether) comprises contacting a liquid feed solution comprising the poly(phenylene ether), an organic acid impurity, and an amine impurity, with a hydrated acidic clay adsorbent under contacting conditions effective to provide a liquid effluent solution, in which the weight average molecular weight of the poly(phenylene ether) is within 1 percent, preferably within 0.5 percent, more preferably within 0.05 percent, of the weight average molecular weight of the poly(phenylene ether) in the feed solution, and a concentration of the amine impurity and the organic acid impurity in parts per million by weight is each reduced by at least 40 percent, preferably at least 50 percent, more preferably at least 80 percent relative to the concentration of each in the feed solution.

A poly(phenylene ether) composition comprises a bifunctional phenylene ether oligomer having a structure specified herein, less than 150 ppm of an organic acid impurity, less than 50 ppm of an amine impurity comprising a $C_{1-36}$ organic amine, and less than 200 ppm of an amine impurity comprising a polymeric amine.

An article comprising the poly(phenylene ether) composition, wherein the article is a component of a printed circuit board, or a food-contacting article.

The above described and other features are exemplified by the following figures and detailed description.

DETAILED DESCRIPTION

The present inventors have determined that a poly(phenylene ether) can be purified using a hydrated acidic clay adsorbent. Advantageously, use of the hydrated acidic clay adsorbent can provide a poly(phenylene ether) with reduced levels of organic acid and amine impurities. Furthermore, the use of the clay adsorbent allows for the simultaneous removal of both organic acid and amine impurities. In another advantageous aspect, the clay adsorbent can be regenerated. The process for purification of a poly(phenylene ether) described herein can provide poly(phenylene ether) materials of higher purity, resulting in higher performing materials useful for a variety of applications.

Accordingly, an aspect of the present disclosure is a process for the purification of a poly(phenylene ether). The process comprises contacting a liquid feed solution with a hydrated acidic clay adsorbent under contacting conditions effective to provide a liquid effluent solution. The liquid feed solution comprises the poly(phenylene ether), an organic acid impurity, and an amine impurity.

Contacting the liquid feed solution with the hydrated acidic clay adsorbent can be, for example, at a temperature of −10 to 200° C., preferably 21 to 65° C. and a pressure of 1 to 5 bar. In some embodiments, suitable contacting conditions can include a volume feed per volume hydrate acidic clay per hour of 0.5 to 10. Within this range, the contacting can be at a volume feed per volume hydrate acidic clay per hour of 1 to 8.

In some embodiments, the method can optionally further comprise regenerating the hydrated acidic clay adsorbent. Numerous regeneration techniques are suitable, and depend upon the type of adsorbent being used. Generally, regeneration requires contacting the adsorbent with a fluid (gas, liquid, or supercritical) under conditions which cause the adsorbed impurities to desorb from the adsorbent. Regenerating the clay adsorbent can be by, for example, washing the adsorbent, drying the adsorbent, desorbing adsorbed impurities from the adsorbent, or a combination thereof. In some embodiments, the adsorbent can be regenerated chemically, thermally, or a combination thereof. Temperatures for regenerating adsorbents can be 100 to 260° C. Suitable temperatures can be selected such that acceptable rates of desorption are achieved without causing substantial degradation or loss of adsorption capacity. The regenerated hydrated acidic clay adsorbent can advantageously be reused in subsequent purification processes.

Suitable poly(phenylene ether)s include those comprising repeating structural units having the formula

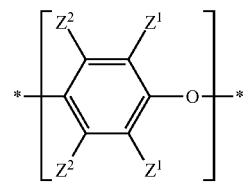

wherein each occurrence of $Z^1$ independently comprises halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ independently comprises hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

In some embodiments, the poly(phenylene ether) is essentially free of incorporated diphenoquinone residues. In the context, "essentially free" means that the less than 1 weight percent of poly(phenylene ether) molecules comprise the residue of a diphenoquinone. As described in U.S. Pat. No. 3,306,874 to Hay, synthesis of poly(phenylene ether) by oxidative polymerization of monohydric phenol yields not only the desired poly(phenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(phenylene ether) (i.e., the diphenoquinone is incorporated into the poly(phenylene ether) structure) by heating the polymerization reaction mixture to yield a poly(phenylene ether) comprising terminal or internal diphenoquinone residues. For example, when a poly(phenylene ether) is prepared by oxidative polymerization of 2,6-dimethylphenol to yield poly(2,6-dimethyl-1, 4-phenylene ether) and 3,3',5,5'-tetramethyldiphenoquinone, reequilibration of the reaction mixture can produce a poly(phenylene ether) with terminal and internal residues of incorporated diphenoquinone. However, such reequilibration reduces the molecular weight of the poly(phenylene ether). Accordingly, when a higher molecular weight poly(phenylene ether) is desired, it may be desirable to separate the diphenoquinone from the poly(phenylene ether) rather than reequilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble. For example, when a poly(phenylene ether) is prepared by oxidative polymerization of 2,6-dimethylphenol in toluene to yield a toluene solution comprising poly(2,6-dimethyl-1, 4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with 1 to 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(phenylene ether) chain can be minimized (e.g., by isolating the poly(phenylene ether) no more than 200 minutes after termination of oxidative polymerization). These approaches are described in International Patent Application Publication No. WO2009/104107 A1 of Delsman et al. In an alternative approach utilizing the temperature-dependent solubility of diphenoquinone in toluene, a toluene solution containing diphenoquinone and poly(phenylene ether) can be adjusted to a temperature of 25° C., at which diphenoquinone is poorly soluble but the poly(phenylene ether) is soluble, and the insoluble diphenoquinone can be removed by solid-liquid separation (e.g., filtration).

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether). In some embodiments, the poly(phenylene ether) comprises a poly(2,6-dimethyl-1,4-phenylene ether) having an intrinsic viscosity of 0.03 to 1 deciliter per gram. For example, the poly(phenylene ether) can have an intrinsic viscosity of 0.25 to 1 deciliter per gram, specifically 0.25 to 0.7 deciliter per gram, more specifically 0.35 to 0.55 deciliter per gram, even more specifically 0.35 to 0.50 deciliter per gram, measured at 25° C. in chloroform using an Ubbelohde viscometer.

In some embodiments, the poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, a block copolymer, or an oligomer as well as combinations thereof.

Poly(phenylene ether) as used herein can also refer to lower molecular weight phenylene ether oligomers. In some embodiments, the phenylene ether oligomer comprises 2,6-dimethyl-1,4-phenylene ether units, 2,3,6-trimethyl-1,4-phenylene ether units, or a combination thereof. In some embodiments, the phenylene ether oligomer can have an intrinsic viscosity of 0.03 to 0.13 deciliter per gram, or 0.05 to 0.1 deciliter per gram, or 0.1 to 0.15 deciliter per gram, measured at 25° C. in chloroform using an Ubbelohde viscometer. The phenylene ether oligomer can have a number average molecular weight of 500 to 7,000 grams per mole, and a weight average molecular weight of 500 to 15,000 grams per mole, as determined by gel permeation chromatography using polystyrene standards. In some embodiments, the number average molecular weight can be 750 to 4,000 grams per mole, and the weight average molecular weight can be 1,500 to 9,000 grams per mole, as determined by gel permeation chromatography using polystyrene standards.

The phenylene ether oligomer can be monofunctional or bifunctional. In some embodiments, the phenylene ether oligomer can be monofunctional. For example, it can have a functional group at one terminus of the polymer chains.

The functional group can be, for example, a hydroxyl group or a (meth)acrylate group, preferably a (meth)acrylate group. In some embodiments, the phenylene ether oligomer comprises poly(2,6-dimethyl-1,4-phenylene ether).

In some embodiment, the phenylene ether oligomer can be bifunctional. For example, it can have functional groups at both termini of the oligomer chain. The functional groups can be, for example, hydroxyl groups or (meth)acrylate groups, preferably (meth)acrylate groups. Bifunctional polymers with functional groups at both termini of the polymer chains are also referred to as "telechelic" polymers. In some embodiments, the phenylene ether oligomer comprises a bifunctional phenylene ether oligomer having the structure

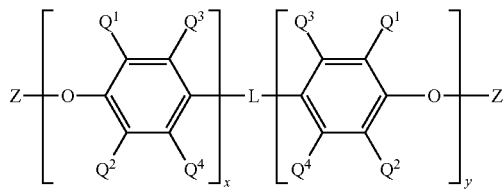

wherein $Q^1$ and $Q^2$ each independently comprise halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ independently comprise hydrogen, halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; Z is hydrogen or (meth)acrylate; x and y are independently 0 to 30, specifically 0 to 20, more specifically 0 to 15, still more specifically 0 to 10, even more specifically 0 to 8, provided that the sum of x and y is at least 2, specifically at least 3, more specifically at least 4; and L has the structure

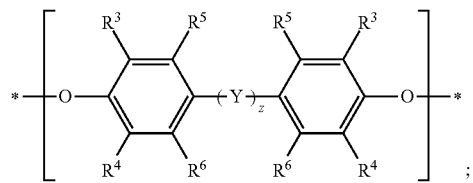

wherein each occurrence of $R^3$ and $R^4$ and $R^5$ and $R^6$ independently comprises hydrogen, halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure comprising

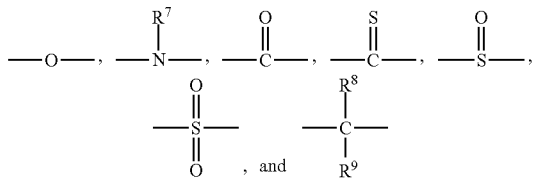

wherein each occurrence of $R^7$ independently comprises hydrogen and $C_1$-$C_{12}$ hydrocarbyl, and each occurrence of $R^8$ and $R^9$ independently comprises hydrogen, $C_1$-$C_{12}$ hydrocarbyl, and $C_1$-$C_6$ hydrocarbylene wherein $R^8$ and $R^9$ collectively form a $C_4$-$C_{12}$ alkylene group.

In an embodiment, the phenylene ether oligomer comprises a bifunctional phenylene ether oligomer having the structure

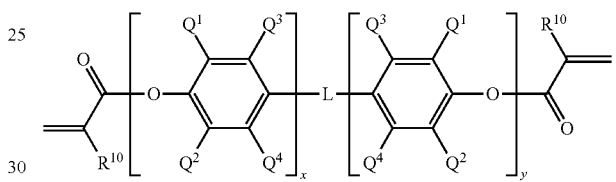

wherein $Q^1$, $Q^2$, $Q^3$, $Q^4$, L, x and y are as defined above $R^{10}$ is methyl or hydrogen In the (meth)acrylate-terminated phenylene ether structure above, there are limitations on the variables x and y, which correspond to the number of phenylene ether repeating units at two different places in the bifunctional phenylene ether oligomer. In the structure, x and y are independently 0 to 30, specifically 0 to 20, more specifically 0 to 15, even more specifically 0 to 10, yet more specifically 0 to 8. The sum of x and y is at least 2, specifically at least 3, more specifically at least 4. A phenylene ether oligomer can be analyzed by proton nuclear magnetic resonance spectroscopy ($^1$H NMR) to determine whether these limitations are met, on average. Specifically, $^1$H NMR can distinguish between protons associated with internal and terminal phenylene ether groups, with internal and terminal residues of a polyhydric phenol, and with terminal residues as well. It is therefore possible to determine the average number of phenylene ether repeating units per molecule, and the relative abundance of internal and terminal residues derived from dihydric phenol.

In some embodiments the phenylene ether oligomer comprises a bifunctional phenylene ether oligomer having the structure

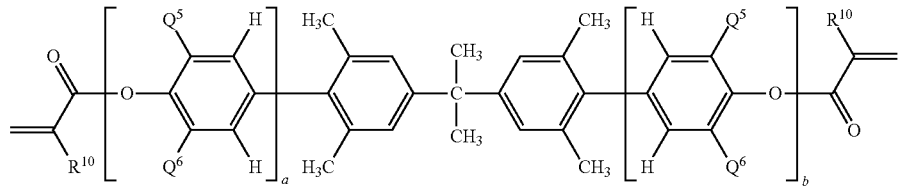

wherein each occurrence of $Q^5$ and $Q^6$ independently comprises methyl, di-n-butylaminomethyl, or morpholinomethyl; and each occurrence of a and b is independently 0 to 20, with the proviso that the sum of a and b is at least 2; and each occurrence of $R^{10}$ is methyl or hydrogen. An exemplary bifunctional phenylene ether oligomer includes NORYL™ Resin SA9000, available from SABIC Innovative Plastics.

In some embodiments the phenylene ether oligomer comprises a bifunctional phenylene ether oligomer having the structure

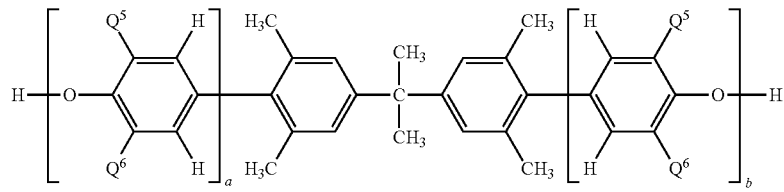

wherein each occurrence of $Q^5$ and $Q^6$ independently comprises methyl, di-n-butylaminomethyl, or morpholinomethyl; and each occurrence of a and b is independently 0 to 20, with the proviso that the sum of a and b is at least 2. An exemplary bifunctional phenylene ether oligomer includes NORYL™ Resin SA90, available from SABIC Innovative Plastics In some embodiments, the poly(phenylene ether) comprises a poly(phenylene ether) homopolymer, oligomer, or combination thereof. The poly(phenylene ether) can preferably comprise a poly(2,6-dimethyl-1,4-phenylene ether).

The liquid feed solution comprises the poly(phenylene ether) in an amount of 1 to 25 weight percent, or 5 to 25 weight percent, or 8 to 25 weight percent, or 10 to 25 weight percent, based on the total weight of the feed solution.

Advantageously, after contacting the liquid feed solution comprising the poly(phenylene ether) with the clay adsorbent, the weight average molecular weight of the poly(phenylene ether) can be within 1 percent, or within 0.5 percent, of the initial weight average molecular weight of the poly(phenylene ether) in the liquid feed solution.

In addition to the poly(phenylene ether), the liquid feed solution further comprises an organic acid impurity. Preferably, the organic acid impurity comprises an acrylic acid, a methacrylic acid, or a combination thereof. The liquid feed solution comprises 10 to 5,000, or 10 to 1,000, or 100 to 5,000 parts per million by weight of the organic acid impurity, based on the total weight of the poly(phenylene ether).

In addition to the poly(phenylene ether) and the organic acid impurity, the liquid feed solution comprises an amine impurity. The amine impurity can generally be any amine impurity used or generated during the manufacture of a poly(phenylene ether). For example, the amine impurity can comprise a $C_{1-36}$ organic amine, an oligomeric amine, a polymeric amine, or a combination thereof. In some embodiments, amine impurity is a $C_{1-36}$ organic amine, preferably wherein the $C_{1-36}$ organic amine comprises di-n-butylamine, dimethylbutylamine, N,N,N',N'-tetramethyl-1,3-diaminopropane, N,N'-di-t-butylethylenediamine, triethanolamine, N-phenyl-ethanolamine, or a combination thereof.

In some embodiment, the amine impurity can comprise a polymeric amine, for example a poly(phenylene ether) or phenylene ether oligomer comprising repeating structural units having the formula

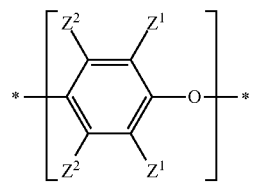

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms, provided that at least one occurrence of $Z^1$ is an aminoalkyl-containing group, preferably a di-n-butylamine group; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As one example, $Z^1$ can comprise (alkyl)$_2$N-containing groups, for example, 3-methyl-4-hydroxy-5-di-n-butylaminomethylphenyl groups) incorporated into the oligomer (also referred to as Mannich groups). The Mannich groups can be present as terminal (end) groups, as internal groups, or both. The Mannich groups can be present on the poly(phenylene ether) polymeric amine impurity in an amount of at least 50 parts per million (ppm), or at least 100 ppm, or at least 150 ppm, or at least 250 ppm, or at least 500 ppm, based on the total weight of the poly(phenylene ether) polymeric amine impurity.

In some embodiments, the liquid feed solution comprises 10 to 5,000, or 10 to 1,000, or 100 to 5,000 parts per million by weight of the amine impurity, based on the total weight of the poly(phenylene ether).

Advantageously, after contacting the liquid feed solution with the clay adsorbent, the concentration of the amine impurity and the organic acid impurity (in parts per million by weight) can each be reduced by at least 40 percent, or at least 50 percent, or at least 80 percent, relative to the initial concentration of each in the liquid feed solution. Concentrations of the organic acid and the amine impurities can be determined by methods which are generally known, including for example, gas chromatography (GC) and proton nuclear magnetic resonance ($^1$H) spectroscopy.

The liquid feed solution can optionally further comprise an organic acid anhydride impurity. When present, the liquid feed solution can comprise 10 to 1,000 parts per million by weight of the organic acid anhydride impurity, and the concentration of the organic acid anhydride impurity (in parts per million by weight) can be reduced by at least 10 percent, relative to its concentration in the feed solution after contacting with the adsorbent. The organic acid anhydride can include, for example, methacrylic anhydride, acrylic anhydride, or a combination comprising at least one of the foregoing.

The liquid feed solution can further comprise a solvent. The solvent can be selected such that the poly(phenylene ether), the organic acid impurity, and the amine impurity can each be solubilized by the solvent. Exemplary solvents can include organic solvents for example aliphatic, cyclic, and aromatic hydrocarbons, including heterocyclic compounds, heteroaryl compounds and halosubstituted aliphatic, cyclic and aromatic hydrocarbons up to per-halo, as well as aliphatic, cyclic and aromatic aldehydes, alcohols, ethers and ketones, and halo substituted derivatives thereof. More specific examples include carbon tetraflouride, pyridine, trichloromethane, dichloromethane, methyl ethyl ketone, methylbutyl ketone, diethylether, diethylene glycol, dimethyl ketone, benzene, toluene, xylene, resorcinol, hydroquinone, tetrahydrofuran, methylene chloride, 1,1,2,2-tetrachloroethane, 1,2-dichloroethylene, chlorobenzene, chloroform, dichlorobenzene and 1,1,2-trichloroethane, and the like, or combinations thereof. In some embodiments, the solvent comprises the solvent in which the poly(phenylene ether) was prepared. In some embodiments, the residual solvent comprises toluene, chloroform, dichloromethane, methyl ethyl ketone, or a combination thereof. In some embodiments, the solvent can preferably be a chlorinated solvent, for example, trichloromethane, dichloromethane,1,2,2-tetrachloroethane, 1,2-dichloroethylene, chlorobenzene, chloroform, dichlorobenzene and 1,1,2-trichloroethane, and the like, or combinations thereof. In a specific embodiment, the solvent can comprise dichloromethane.

The liquid feed solution is contacted with the hydrated acidic clay adsorbent. The solid materials useful as sorbent materials in the method of the present disclosure can be described as hydrated acid-treated smectite clays, such as montmorillonite, bentonite, vermiculite, hectorite, saponite, beidillite, and the like. In these clays, approximately every sixth aluminum ion has been replaced by a magnesium ion. This produces a crystal lattice with a negative charge which is neutralized by the absorption of metallic cations (such as $Na^+$) on the surface. These surface cations are readily removed by treatment with an acid (such as HCl or $H_2SO_4$), wherein hydrogen ions are exchanged for the metallic ions. The acid-treated material can be designated a magnesium-substituted hydrogen montmorillonite. Sorbent materials of this type are sold commercially under the trade name of "Filtrol" by the Chemical Catalysts Group of Engelhard Corporation, Edison, N.J. Specific acid-treated commercial clays include Filtrol Grade 71, Filtrol Grade F24 and Filtrol Grade 25.

In some embodiments, the hydrated acidic clay can comprise an illite chloride clay, a kaolinite clay, a smectite clay, a vermiculite clay, or a combination comprising at least one of the foregoing. For example, the hydrated acidic clay can comprise amesite, attapulgite, beidillite, chryotile, dickite, illite chloride, lizardite, halloysite, hectorite, kaolinite, montmorillonite, nacrite, nontronite, saponite, sepiolite, smectite, vermiculite, or a combination comprising at least one of the foregoing. In a very specific embodiment, the clay can comprise a montmorillonite.

Hydrated acidic clay adsorbents particularly useful for the present process can contains 0.01 to 0.2 kilogram of water per kilogram of dry clay, or 0.05 to 0.09 kilogram of water per kilogram of dry clay, wherein dry clay is defined as acid-treated clay which has been heated at 115° C. for 24 hours at 0 psig (i.e., at atmospheric pressure). If a commercial clay material does not contain a sufficient amount of water, the clay can be mixed with a suitable amount of water so as to provide hydrated acid-treated clay particles.

A typical hydrated acidic clay can generally have an acidity of 5 to 400 milligrams of potassium hydroxide (KOH) per gram of clay at phenolphthalein end point. Useful hydrated acidic clays can further have an average particle size of 10 to 20 mesh (e.g., 100 to 2000 micrometers), and a surface are (BET/$N_2$ method) of 200 to 500 square meters per gram. In some embodiments, the hydrated acidic clay can have a bulk density of 0.7 to 0.9 grams per cubic centimeter.

Contacting the liquid feed solution with the clay adsorbent can generally be carried out using any suitable equipment. For example, a vertical tubular guard bed reactor containing the hydrated acidic clay adsorbent can be used. The liquid feed solution can be flowed through the reactor, either in a down-flow, or an up-flow mode.

The process of the present disclosure can provide a poly(phenylene ether) composition having higher purity. Thus, a poly(phenylene ether) purified according to the process described herein represents another aspect of the present disclosure. For example, a poly(phenylene ether) composition can comprise a poly(phenylene ether), less than 150 ppm of an organic acid impurity or greater than 0 and less than 150 ppm of an organic acid impurity, less than 50 ppm of an amine impurity comprising a $C_{1-36}$ amine or greater than 0 and less than 50 ppm of an amine impurity comprising a $C_{1-36}$ amine, and less than 200 ppm of an amine impurity comprising a polymeric amine or greater than 0 and less than 200 ppm of an amine impurity comprising a polymeric amine. Advantageously, the poly(phenylene ether) composition can exhibit one or more desirable properties as a result of the low levels of organic acid and amine impurities, for example, improved yellowness index and dielectric constant.

The poly(phenylene ether) composition having improved purity can also be useful for forming various thermoplastic compositions, wherein the poly(phenylene ether) can be combined with a polymer different from the poly(phenylene ether).

The polymer different from the poly(phenylene ether) can be, for example, polyesters, melamines, poly(vinyl chloride) s, polystyrenes, polyethylenes, chlorinated polyethylenes, polytetrachloroethylenes, polypropylenes, polycarbonates, polyimides, polyetherimides, poly(ether ether ketone)s, polysulfones, polyamides, copolymers of styrene and acrylonitrile, copolymers of alpha-methylstyrene and acrylonitrile, copolymers of acrylonitrile and butadiene and styrene, copolymers of acrylonitrile and styrene and acrylate esters, polyacetals, copolymers of ethylene and polytetrafluoroethylene, rubber-modified polystyrenes, polyurethanes, and combinations thereof.

In some embodiments, the composition can comprise 1 to 99 weight percent of the poly(phenylene ether), based on the total weight of the composition. Within this range, the poly(phenylene ether) can be present in an amount of 10 to 90 weight percent, or 20 to 75 weight percent, or 25 to 60 weight percent. The composition can further comprise 1 to 99 weight percent of the polymer different from the poly (phenylene ether). Within this range, the poly(phenylene ether) can be present in an amount of 10 to 90 weight percent, or 25 to 80 weight percent, or 40 to 75 weight percent.

The poly(phenylene ether) composition can optionally further comprise one or more additives, with the proviso that the one or more additives do not significantly adversely affect one or more desirable properties of the poly(phenylene ether) composition). Exemplary additives can include stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations thereof. When present, such additives are typically used in a total amount of less than or equal to 10 weight percent, specifically less than or equal to 5 weight percent, based on the total weight of the poly(phenylene ether) composition.

The poly(phenylene ether) composition further comprising the polymer different from the poly(phenylene ether) and optionally, an additive can be prepared by any method that is generally known. For example, the composition can be prepared by melt-blending or melt-kneading the components of the composition. The melt-blending or melt-kneading can be performed using common equipment such as ribbon blenders, HENSCHEL™ mixers, BANBURY' mixers, drum tumblers, single-screw extruders, twin-screw extruders, multi-screw extruders, co-kneaders, and the like. For example, the present composition can be prepared by melt-blending the components in a twin-screw extruder.

In some embodiments, the poly(phenylene ether) composition can exclude polymers different from the poly(phenylene ether). For example, in some embodiments, the poly(phenylene ether) composition can exclude polyamides, poly(alkenyl aromatics), or a combination thereof.

The poly(phenylene ether) composition can also be useful in the preparation of various articles for a variety of applications. For example, the poly(phenylene ether) composition can be useful as insulation material for printed wiring boards (e.g., for use in electronics applications), for preparing articles suitable for food contact applications, as a resist material, a sealant for a liquid crystal device, or a UV coating composition in a buildup wiring board, as a color filter of a liquid crystal, as insulation sealing agents or soldering resist materials for printed circuit boards. The composition can also be useful for photosensitive materials, optical materials, dental materials, electronic materials, or as a crosslinking agent for various polymers. The composition can also be useful in forming coatings, as well as prepregs, laminates, varnishes, and adhesive compositions for printed circuit board. Accordingly, another aspect of the present disclosure is an article comprising the poly(phenylene ether) composition. Suitable methods of forming such articles include single layer and multilayer sheet extrusion, injection molding, blow molding, film extrusion, profile extrusion, pultrusion, compression molding, thermoforming, pressure forming, hydroforming, vacuum forming, and the like. Combinations of the foregoing article fabrication methods can be used.

This disclosure is further illustrated by the following examples, which are non-limiting.

EXAMPLES

The process of purifying a poly(phenylene ether) of the present disclosure was demonstrated using montmorillonite clay adsorbent and a poly(phenylene ether) solution. The poly(phenylene ether) used in the present example was a phenylene ether oligomer comprising repeating units derived from 2,6-dimethylphenol and a single unit of tetramethylbisphenol A and having vinyl end groups, having an intrinsic viscosity of 0.09 deciliter per gram and a number average molecular weight of 2,300 grams/mole, available as NORYL™ Resin SA9000 from SABIC. The liquid feed solution was prepared by dissolving one gram of the phenylene ether oligomer in 5 milliliters of dichloromethane. The resulting liquid feed solution was passed through a syringe containing 9 grams of the clay adsorbent. The feed solution was collected and analyzed after passage through the clay.

Gas chromatography (GC) was used to analyze residual levels of dibutyl amine (DBA) and dimethylamino pyridine (DMAP). The GC analysis indicated that the concentrations of DBA and DMAP were reduced 5-10 times after passage over the clay adsorbent. Additionally, the molecular weight of the phenylene ether did not change after treatment with the clay adsorbent. Organic acid and anhydride impurities were also observed to be significantly reduced. Comparison of the impurity concentrations before and after treatment with the clay adsorbent is shown in Table 1, where the concentration of each impurity is provided in parts per million by weight (ppm), and was determined using GC.

TABLE 1

| Ex. | Description | Methacrylic acid (ppm) | Methacrylic anhydride (ppm) | Dimethyl aminopyridine (ppm) | Dibutyl amine (ppm) |
| --- | --- | --- | --- | --- | --- |
| 1 | Untreated PPE | 306 | 514 | 882 | 70 |
| 2 | Clay treated PPE | 129 | 459 | <50 | 10 |

Molecular weight was determined using gel permeation chromatograph (GPC) eluting with chloroform, with molecular weights determined relative to polystyrene standards. Table 2 shows the molecular weight and dispersity measured by GPC for the PPE sample before and after treatment with the clay adsorbent. "Mw" refers to the weight average molecular weight, and "Mn" refers to the number average molecular weight, and "PDI" refers to the polydispersity index.

TABLE 2

| Ex. | Description | Mw | Mn | PDI |
| --- | --- | --- | --- | --- |
| 1 | Untreated PPE | 5327 | 3043 | 1.8 |
| 2 | Clay treated PPE | 5357 | 3058 | 1.8 |

This disclosure further encompasses the following aspects.

Aspect 1: A process for purification of a poly(phenylene ether), the process comprising contacting a liquid feed solution comprising the poly(phenylene ether), an organic acid impurity, and an amine impurity with a hydrated acidic clay adsorbent under contacting conditions effective to provide a liquid effluent solution, in which the weight average molecular weight of the poly(phenylene ether) is within 1 percent, preferably within 0.5 percent, more preferably within 0.05 percent, of the weight average molecular weight of the poly(phenylene ether) in the feed solution, and a concentration of the amine impurity and the organic acid impurity in parts per million by weight is each reduced by at least 40 percent, preferably at least 50 percent, more preferably at least 80 percent relative to the concentration of each in the feed solution.

Aspect 2: The process of aspect 1, wherein said contacting conditions comprise a temperature of −10 to 200° C., preferably 21 to 65° C.; a pressure of 1 to 5 bar; and 0.5 to 10 volume feed per volume hydrated acidic clay per hour, preferably 1 to 8 volume feed per volume hydrated acidic clay per hour.

Aspect 3: The process of any of the foregoing aspects, further comprising regenerating the hydrated acidic clay adsorbent.

Aspect 4: The process of any of the foregoing aspects, wherein the liquid feed solution further comprises an organic acid anhydride impurity, and a concentration of the organic acid anhydride impurity in parts per million by weight is reduced at least 10 percent relative to its concentration in the feed solution.

Aspect 5: The process of any of the foregoing aspects, wherein the poly(phenylene ether) comprises a poly(2,6-dimethyl-1,4-phenylene ether); and the feed solution comprises 1 to 25 weight percent, preferably 10 to 20 weight percent of the poly(phenylene ether), based on the total weight of the feed solution.

Aspect 6: The process of any of the foregoing aspects, wherein the organic acid impurity comprises an acrylic acid or methacrylic acid.

Aspect 7: The process of any of the foregoing aspects, wherein the liquid feed solution comprises 10 to 5,000 parts per million by weight of the organic acid impurity, based on the total weight of the poly(phenylene ether).

Aspect 8: The process of any of the foregoing aspects, wherein the amine impurity comprises a $C_{1-36}$ organic amine, an oligomeric amine, a polymeric amine, or a combination thereof.

Aspect 9: The process of any of the foregoing aspects, wherein the organic amine comprises di-n-butylamine, dimethylbutylamine, N,N,N',N'-tetramethyl-1,3-diaminopropane, N,N'-di-t-butylethylenediamine, triethanolamine, N-phenyl-ethanolamine, or a combination thereof.

Aspect 10: The process of aspect 8, wherein the polymeric amine comprises a polyphenylene ether comprising repeating structural units having the formula

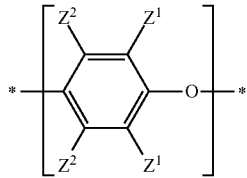

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms, provided that at least one occurrence of $Z^1$ is an aminoalkyl-containing group, preferably a di-n-butylamine group; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

Aspect 11: The process of any of the foregoing aspects, wherein the feed solution comprises 10 to 5,000 parts per million by weight of the organic amine impurity, based on the total weight of the poly(phenylene ether).

Aspect 12: The process of any of the foregoing aspects, wherein the hydrated acidic clay comprises an illite chloride clay, a kaolinite clay, a smectite clay, a vermiculite clay, or a combination comprising at least one of the foregoing.

Aspect 13: The process of any of the foregoing aspects, wherein the hydrated acidic clay comprises amesite, attapulgite, beidillite, chryotile, dickite, illite chloride, lizardite, halloysite, hectorite, kaolinite, montmorillonite, nacrite, nontronite, saponite, sepiolite, smectite, vermiculite, or a combination comprising at least one of the foregoing; preferably wherein the clay comprises a montmorillonite.

Aspect 14: The process of any of aspects 12 to 13, wherein the hydrated acidic clay adsorbent contains 0.01 to 0.2 kilo of water per kilo of dry clay, preferably 0.05 to 0.09 kilo of water per kilo of dry clay; has an acidity of 5 to 400 milligram of potassium hydroxide per gram clay at phenolphthalein end point, has a particle size of 100 to 2000 micrometers, and has a BET/dinitrogen surface area of 200 to 500 square meters per gram.

Aspect 15: A poly(phenylene ether) composition comprising a bifunctional

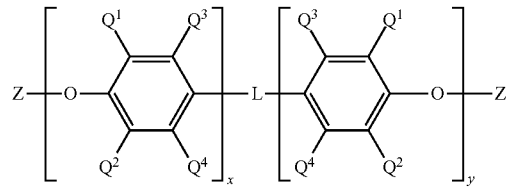

phenylene ether oligomer having the structure wherein $Q^1$ and $Q^2$ are each independently halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently hydrogen, halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to 30; Z is hydrogen, methacrylate, or acrylate; L has the structure

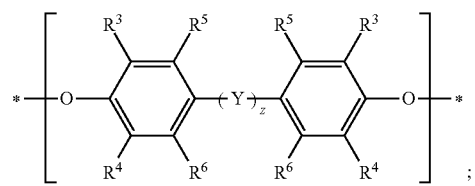

wherein each occurrence of $R^3$ and $R^4$ and $R^5$ and $R^6$ is independently hydrogen, halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure comprising

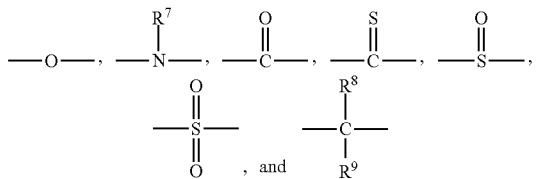

wherein each occurrence of $R^7$ is independently hydrogen and $C_1$-$C_{12}$ hydrocarbyl, and each occurrence of $R^8$ and $R^9$ is independently comprises hydrogen, $C_1$-$C_{12}$ hydrocarbyl, and $C_1$-$C_6$ hydrocarbylene wherein $R^8$ and $R^9$ collectively form a $C_4$-$C_{12}$ cycloalkylene group, less than 150 ppm of an organic acid impurity, less than 50 ppm of an amine impurity comprising a $C_{1-36}$ organic amine, and less than 200 ppm of an amine impurity comprising a polymeric amine.

Aspect 16: The poly(phenylene ether) composition of aspect 15, further comprising a polymer different than the poly(phenylene ether).

Aspect 17: An article comprising the poly(phenylene ether) composition of aspect 15 or 16, wherein the article is a component of a printed circuit board or a food-contacting article.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —CH$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl)a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —CH$_2$CH$_2$CN is a C$_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A process for purification of a poly(phenylene ether), the process comprising
contacting a liquid feed solution comprising
the poly(phenylene ether),
an organic acid impurity, and
an amine impurity
with a hydrated acidic clay adsorbent under contacting conditions effective to provide a liquid effluent solution, in which
the weight average molecular weight of the poly(phenylene ether) is within 1 percent, of the weight average molecular weight of the poly(phenylene ether) in the feed solution, and
a concentration of the amine impurity and the organic acid impurity in parts per million by weight is each reduced by at least 40 percent relative to the concentration of each in the feed solution.

2. The process of claim 1, wherein said contacting conditions comprise
a temperature of −10 to 200° C.,
a pressure of 1 to 5 bar; and
0.5 to 10 volume feed per volume hydrated acidic clay per hour.

3. The process of claim 1, wherein the liquid feed solution further comprises an organic acid anhydride impurity, and a concentration of the organic acid anhydride impurity in parts per million by weight is reduced at least 10 percent relative to its concentration in the feed solution.

4. The process of claim 1, wherein
the poly(phenylene ether) comprises a poly(2,6-dimethyl-1,4-phenylene ether); and
the feed solution comprises 1 to 25 weight percent, based on the total weight of the feed solution.

5. The process of claim 1, wherein the organic acid impurity comprises an acrylic acid or methacrylic acid, and wherein the liquid feed solution comprises 10 to 5,000 parts per million by weight of the organic acid impurity, based on the total weight of the poly(phenylene ether).

6. The process of claim 1, wherein the amine impurity comprises a $C_{1-36}$ organic amine, an oligomeric amine, a polymeric amine, or a combination thereof, and wherein the feed solution comprises 10 to 5,000 parts per million by weight of the organic amine impurity, based on the total weight of the poly(phenylene ether).

7. The process of claim 1, wherein the organic amine comprises di-n-butylamine, dimethylbutylamine, N,N,N',N'-tetramethyl-1,3-diaminopropane, N,N'-di-t-butylethylenediamine, triethanolamine, N-phenyl-ethanolamine, or a combination thereof.

8. The process of claim 6, wherein the polymeric amine or oligomeric amine comprise a polyphenylene ether comprising repeating structural units having the formula

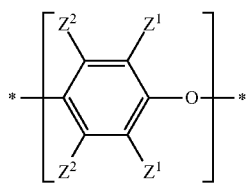

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms, provided that at least one occurrence of $Z^1$ is an aminoalkyl-containing group; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

9. The process of claim 1, wherein the hydrated acidic clay comprises an illite chloride clay, a kaolinite clay, a smectite clay, a vermiculite clay, or a combination comprising at least one of the foregoing, and
wherein the hydrated acidic clay adsorbent
contains 0.01 to 0.2 kilo of water per kilo of dry clay;
has an acidity of 5 to 400 milligram of potassium hydroxide per gram clay at phenolphthalein end point,
has a particle size of 100 to 2000 micrometers, and
has a BET/dinitrogen surface area of 200 to 500 square meters per gram.

10. A poly(phenylene ether) composition comprising a bifunctional phenylene ether oligomer having the structure

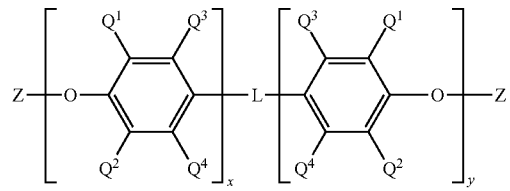

wherein $Q^1$ and $Q^2$ are each independently halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms;
each occurrence of $Q^3$ and $Q^4$ is independently hydrogen, halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms;
x and y are independently 0 to 30;
Z is hydrogen, methacrylate, or acrylate;
L has the structure

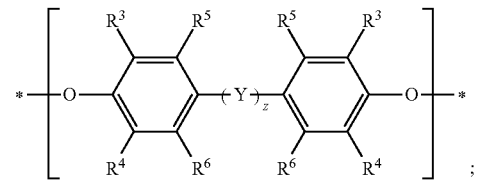

wherein each occurrence of $R^3$ and $R^4$ and $R^5$ and $R^6$ is independently hydrogen, halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure comprising

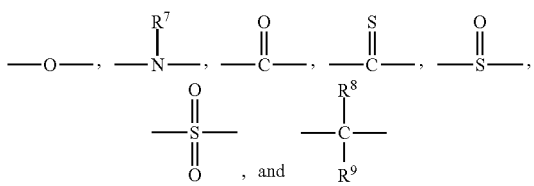

wherein each occurrence of $R^7$ is independently hydrogen and $C_1$-$C_{12}$ hydrocarbyl, and each occurrence of $R^8$ and $R^9$ is independently comprises hydrogen, $C_1$-$C_{12}$ hydrocarbyl, and $C_1$-$C_6$ hydrocarbylene wherein $R^8$ and $R^9$ collectively form a $C_4$-$C_{12}$ cycloalkylene group, less than 150 ppm of an organic acid impurity, less than 50 ppm of an amine impurity comprising a $C_{1-36}$ organic amine, and less than 200 ppm of an amine impurity comprising a polymeric amine.

11. The poly(phenylene ether) composition of claim 10, further comprising a polymer different than the poly(phenylene ether).

12. An article comprising the poly(phenylene ether) of claim 10, wherein the article is a component of a printed circuit board, or a food-contacting article.

13. The process of claim 1, wherein the hydrated acidic clay comprises amesite, attapulgite, beidillite, chryotile, dickite, illite chloride, lizardite, halloysite, hectorite, kaolinite, montmorillonite, nacrite, nontronite, saponite, sepiolite, smectite, vermiculite, or a combination comprising at least one of the foregoing.

14. The process of claim 1, wherein said contacting conditions comprise
a temperature of 21 to 65° C.;
a pressure of 1 to 5 bar; and
1 to 8 volume feed per volume hydrated acidic clay per hour.

15. The process of claim 1, wherein
the poly(phenylene ether) comprises a poly(2,6-dimethyl-1,4-phenylene ether); and
the feed solution comprises 10 to 20 weight percent of the poly(phenylene ether), based on the total weight of the feed solution.

16. The process of claim 1, wherein the weight average molecular weight of the poly(phenylene ether) is within 0.5 percent, more preferably within 0.05 percent, of the weight average molecular weight of the poly(phenylene ether) in the feed solution.

17. The process of claim 8, wherein $Z_1$ is a di-n-butylamine group.

18. The process of claim 1, wherein
the poly(phenylene ether) comprises a poly(2,6-dimethyl-1,4-phenylene ether); and
the feed solution comprises 10 to 20 weight percent of the poly(phenylene ether), based on the total weight of the feed solution.

* * * * *